H. O. JACKSON & H. C. VIZENTS.
ELECTRIC SECONDARY CLOCK.
APPLICATION FILED JUNE 10, 1908.

909,418.

Patented Jan. 12, 1909.
3 SHEETS—SHEET 1.

Witnesses:
John Enders
Chas. H. Buell

Inventors:
Henry O. Jackson,
Herman C. Vizents,
By Dyrenforth, Lee, Chritton & Wiles,
Attys.

H. O. JACKSON & H. C. VIZENTS.
ELECTRIC SECONDARY CLOCK.
APPLICATION FILED JUNE 10, 1908.
909,418.
Patented Jan. 12, 1909.
3 SHEETS—SHEET 2.
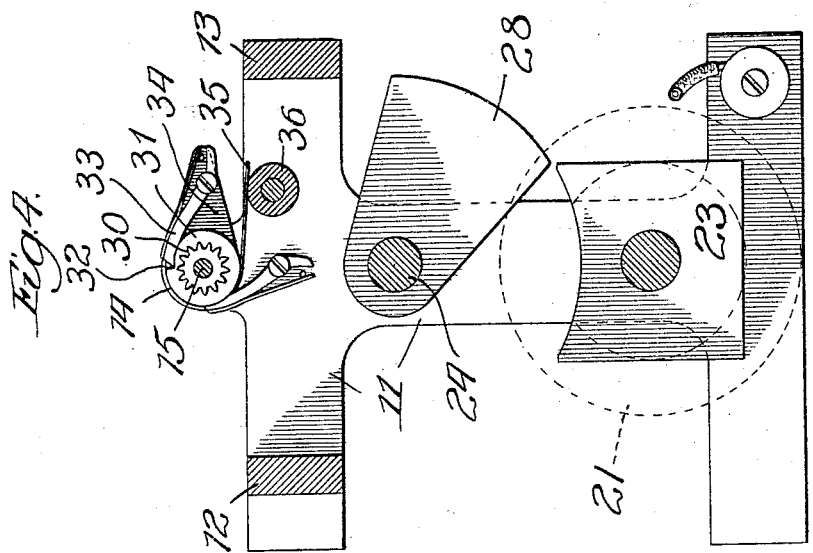
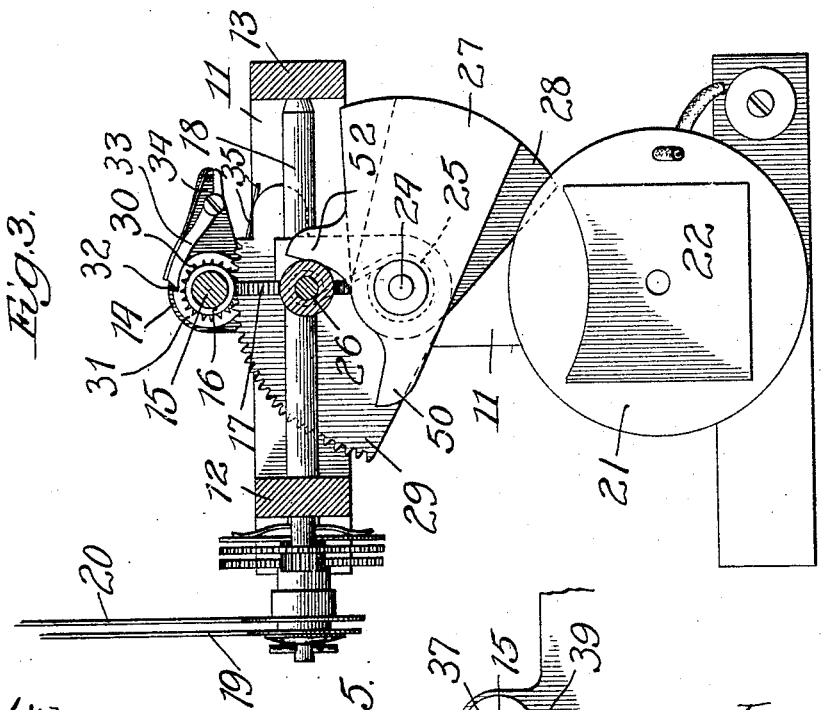
Witnesses:
John Enders
Chas. H. Buell
Inventors,
Henry O. Jackson,
Herman C. Vizents,
By Dyrenforth, Lee, Chritton & Wiles,
Attys

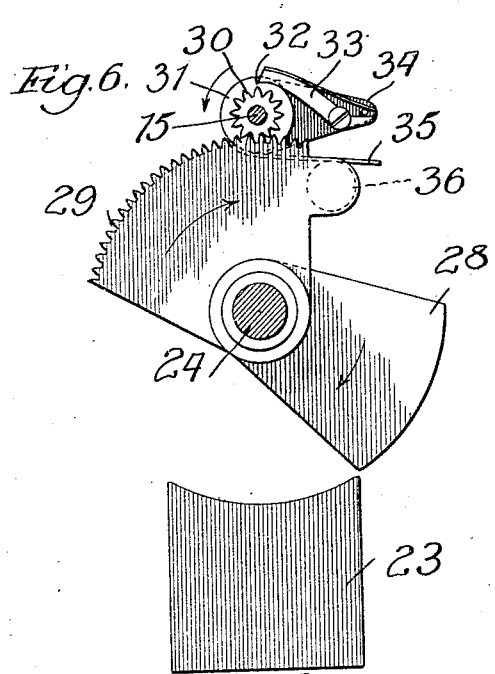
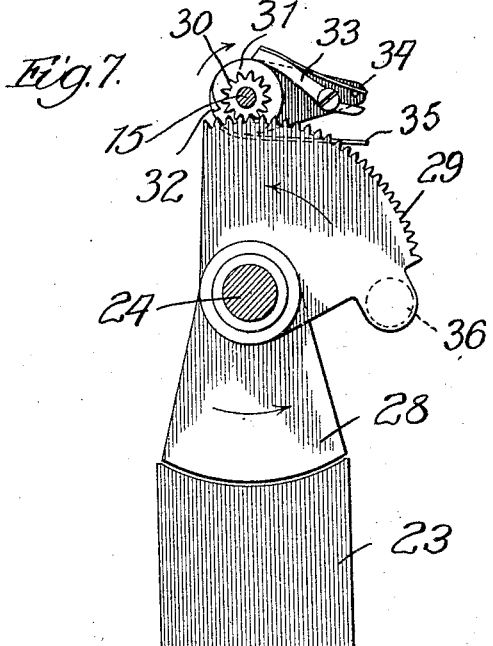
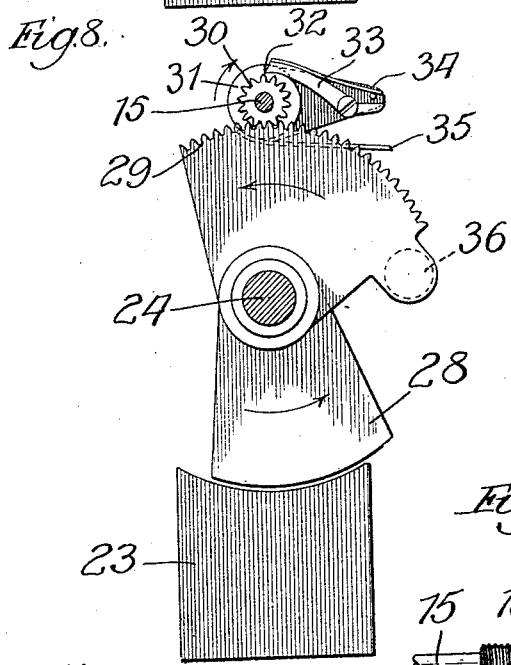
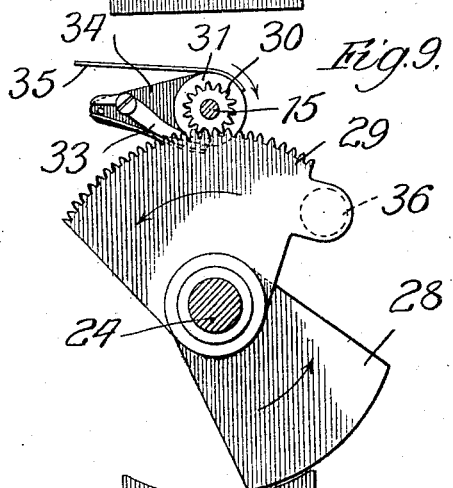
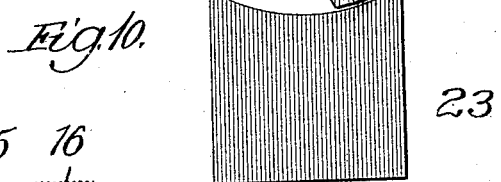
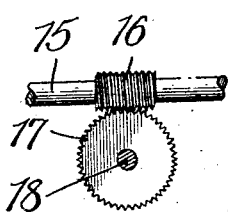

UNITED STATES PATENT OFFICE.

HENRY O. JACKSON AND HERMAN C. VIZENTS, OF CHICAGO, ILLINOIS, ASSIGNORS, BY MESNE ASSIGNMENTS, TO TOM McNAUGHTON, OF LONDON, ENGLAND.

ELECTRIC SECONDARY CLOCK.

No. 909,418.  Specification of Letters Patent.  Patented Jan. 12, 1909.

Application filed June 10, 1908. Serial No. 437,673.

*To all whom it may concern:*

Be it known that we, HENRY O. JACKSON and HERMAN C. VIZENTS, citizens of the United States, residing at Chicago, in the county of Cook and State of Illinois, have invented a new and useful Improvement in Electric Secondary Clocks, of which the following is a specification.

This invention relates to an improvement in the class of clocks that are driven at predetermined uniform intervals by a master-clock through suitable electric connection therewith.

Figure 1:
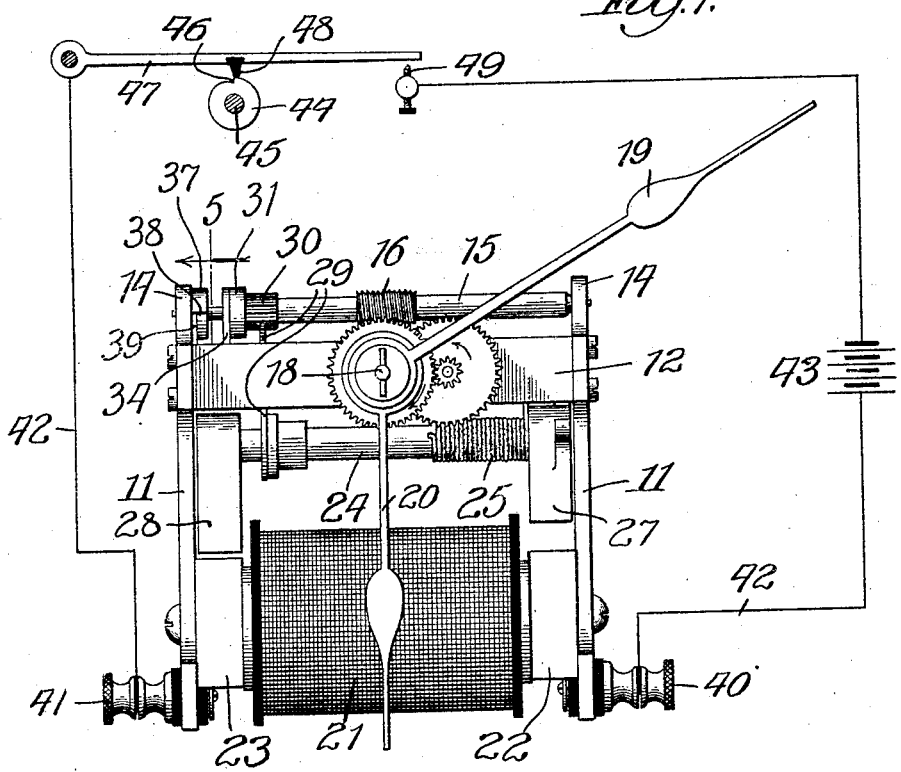
Figure 2:
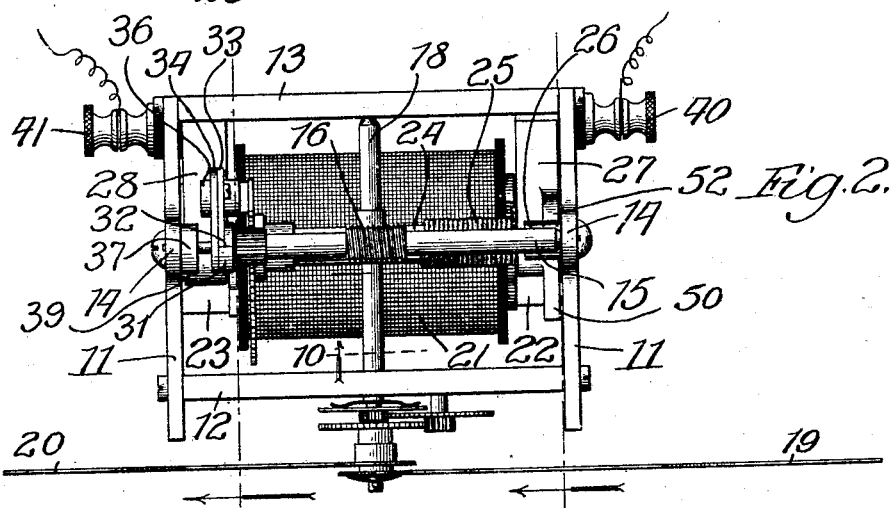

Referring to the accompanying drawings, Figure 1 shows the improved mechanism by a view in front elevation with the electric controlling mechanism therefor of a master-clock represented diagrammatically; Fig. 2 is a plan view of the mechanism; Figs. 3 and 4 are sections respectively on lines 3 and 4 Fig. 2; Fig. 5 is a broken enlarged section on line 5, Fig. 1; Figs. 6, 7, 8 and 9 are similar sections showing different positions of the electro-magnet-operated means for driving the clock-hands, and Fig. 10 is a section on line 10, Fig. 2.

The mechanism is supported in a frame shown as comprising similar side-members 11 of general I-shape with forward and rear bearing-bars 12 and 13 connecting the side-members at their head-portions, from the centers of which similar bearings 14 rise for journaling therein a worm-shaft 15. The worm 16 meshes with a worm-wheel 17 on a shaft 18 journaled in the bars 12, 13 to extend transversely of the shaft 15 and carrying on its forward projecting end the minute and hour hands 19 and 20 which are geared together in the usual way, as represented, in the ratio to cause a complete rotation of the minute-shaft to turn the hour-hand through the space of an hour on the clock-dial (not shown).

The described worm-gear affords a positively effective lock for the mechanism against any force or accidental movement of the minute-hand, and it is the primary object of this improvement to adapt that particular form of driving-gear in a clock to our purpose.

On the frame is supported an electro-magnet, a suitable form of which is represented at 21 extending horizontally between and connecting the frame-members 11 near their bases and having its pole-pieces 22 and 23 provided with concave upper faces. A rock-shaft 24 is journaled in the frame-members to extend below and parallel with the worm-shaft and it carries a spiral spring 25 having one end fastened to the shaft and the opposite end to a stud 26 on the frame for returning the shaft to normal position. Similar armatures 27 and 28, shown of general segment-shape, are fastened on the shaft 24 inside the frame to register, respectively, with the pole-pieces 22 and 23, to the concave faces of which the convex free ends of the armatures conform. A segmental rack 29 on the shaft 24 meshes with a pinion 30 loosely surrounding the worm-shaft and carrying on one end a circular head 31 provided with a peripheral shoulder 32 to be engaged by a spring-pressed pawl 33 on an arm 34 rigidly fastened to the worm-shaft, and shown to have a spring 35 extending from it to engage with a cushioning stud 36 extending from the adjacent side of the rack 29. The worm-shaft, one complete rotation of which turns the minute-shaft to move the hand 19 through a minute-interval on said dial, also carries to rotate with it a circular head 37 provided with a peripheral stop-shoulder 38 to be engaged by a spring-pressed detent 39 on the adjacent frame-member 11.

The armatures are preferably so set on their supporting-shaft as to cause one to be normally, or under the deënergized condition of the electromagnet, quite close to the adjacent pole-piece while the other, to be out of the field of attraction, is more removed from the pole-piece adjacent to it, whereby as the resistance of the spring 25 to turning the rock-shaft 24 by the attraction of the armatures increases, the power of the magnet shall be exerted upon both armatures to cause one to supplement the other, while when that resistance is the least, only one of the pole-pieces is required to operate, thus economizing in current. For energizing the magnet it is included, at binding posts 40, 41 on the frame, in the circuit 42 of an electric-current generator conventionally represented at 43, said circuit also including a contact making and breaking device in a master-clock (not shown), a simple form of such device being represented in Fig. 1 as consisting of a circular cam-like head 44 on the minute-shaft 45 of the master-clock and provided with a peripheral shoulder 46; a pivotal contact-finger 47 having a depending stud 48 riding on the cam-head 44 to normally hold that finger out of engagement with a contact-point 49 and thus maintain the circuit open until momentarily closed in each rotation of the shaft 45 by the shoulder 46 passing the stud 48 and permitting the latter to drop and contact the finger with the point 49.

The operation is as follows: With each closure of the circuit, resultant energizing of the electromagnet causes it to attract the armatures until the armature 28 is turned from its normal position in Fig. 6 to the position represented in Fig. 7, at which it is stopped by a finger 50 on the armature 27 engaging the cushioning stop 26 in its path, a similar finger 52 on that armature engaging the same stop to limit the throw of the armatures in the opposite direction. The attraction of the armatures from the normal position of the armature represented in Fig. 6 to that represented in Fig. 7 turns the shaft 24 against the resistance of the spring 25 to cause the rack 29 to turn the pinion 30 loosely about the worm-shaft until the shoulder 32 clears the pawl 33, which thereupon drops into its return path as represented in Fig. 7. When the electromagnet is deënergized by a separation of the contacts due to the continued rotation of the head 44 immediately raising the finger 47, the recoil of the spring 25 turns the shaft 24 in the opposite direction to cause the rack 29 to turn in the direction of the arrow upon it in Fig. 8 and turn the pinion 30 accordingly to engage the shoulder 32 with the pawl 33 and drive the arm 34 to turn the worm-shaft by the continued movements of the armatures and the rack in the directions indicated by the arrows upon them in Fig. 9. The complete return-movement of the shaft 24, when it is arrested by the finger 52, effects a complete rotation of the worm-shaft which thus turns the shaft 18 the proper extent to move the minute-hand through a minute-space on the clock-dial. At the end of the described return-movement wherein the head 37 turns with the worm-shaft, the shoulder on that head is engaged by the detent 39 to prevent any back-lash of the pinion, and at the end of said return-movement the spring 35 encounters the stop 36 on the rack to cushion against noise and shock the stoppage of the arm 34.

We claim:

1. In an electric secondary-clock movement, the combination with a frame and a hand-shaft journaled therein, of a worm-gear for turning said shaft, an electromagnet provided with means for including it in an electric circuit, a spring-retracted armature supported on said frame to be attracted by said magnet in opposition to the spring and geared to the worm-shaft of said gear to turn without moving the same under the magnet-attraction, and means engaging said worm-shaft with the armature under its spring-retracted movement, for the purpose set forth.

2. In an electric secondary-clock movement, the combination with a frame and a hand-shaft journaled therein, of a worm-gear for turning said shaft, an electromagnet provided with means for including it in an electric circuit, a spring-retracted rock-shaft journaled in the frame, armatures supported on said rock-shaft, one for each pole of said magnet and one normally extending closer to its pole-magnet than the other relative to its pole, to be attracted by the magnet in opposition to said spring, gearing connecting said rock-shaft and worm-shaft to turn said rock-shaft against the spring-resistance without turning said worm-shaft, and means engaging said rock-shaft with the worm-shaft to turn the latter in the movement of the armatures under the spring-retraction of said rock-shaft, for the purpose set forth.

3. In an electric secondary-clock movement, the combination with a frame and a hand-shaft journaled therein, of a worm-wheel on said shaft, a worm-shaft journaled in the frame with its worm meshing with said wheel, a pinion loosely surrounding the worm-shaft and provided with a head having a shoulder, an arm secured on the worm-shaft and carrying a pawl to engage said shoulder, a spring-retracted rock-shaft journaled in the frame, a rack on said rock-shaft engaging said pinion, an electromagnet provided with means for including it in an electric circuit, and an armature extending from said rock-shaft to coöperate with a pole of said magnet, for the purpose set forth.

4. In an electric secondary-clock movement, the combination with a frame and a hand-shaft journaled therein, of a worm-wheel on said shaft, a worm-shaft journaled in the frame with its worm meshing with said wheel, a pinion loosely surrounding the worm-shaft and provided with a head having a shoulder, an arm secured on the worm-shaft and carrying a pawl to engage said shoulder, a spring-retracted rock-shaft journaled in the frame, a rack on said rock-shaft engaging said pinion and a shouldered head on said rock-shaft, a detent on the frame for engaging said shouldered head, an electromagnet provided with means for including it in an electric circuit, and an armature extending from said rock-shaft to coöperate with a pole of said magnet, for the purpose set forth.

5. In an electric secondary-clock movement, the combination with a frame and a hand-shaft journaled therein, of a worm-wheel on said shaft, a worm-shaft journaled in the frame with its worm meshing with said wheel, a pinion loosely surrounding the worm-shaft and provided with a head having a shoulder, an arm secured on the worm-shaft and carrying a pawl to engage said shoulder, a spring-retracted rock-shaft journaled in the frame, a rack on said rock-shaft engaging said pinion, an electromagnet supported in the frame, and armatures extending from said rock-shaft each to coöperate with a pole of said magnet, said armatures being normally at varying degrees of proximity to the respective magnet-poles, for the purpose set forth.

6. In an electric secondary-clock movement, the combination of a frame, a hand-shaft journaled therein and carrying a worm-wheel, a worm-shaft with its worm meshing with said wheel, a pinion loosely surrounding the worm-shaft and provided with a circular end-head having a peripheral shoulder, an arm extending from the worm-shaft and carrying a spring-pressed pawl to engage said shoulder, a circular head secured on the worm-shaft and provided with a circular holder, a spring-pressed detent on the frame extending into the path of said circular head to engage the shoulder thereon, a segmental rack extending from said rock-shaft into engagement with said pinion and provided with a cushioning stud for said pawl, an electromagnet supported in the frame and its poles provided with concave faces, an armature on said rock-shaft extending with its convex end normally into close proximity to one of said pole-faces, a second similar armature extending from said rock-shaft into normally less close proximity to the other of said pole-faces and provided with stop-fingers, and a cushioning stud on the frame extending between said fingers, for the purpose set forth.

HENRY O. JACKSON.
HERMAN C. VIZENTS.

In presence of—
R. A. RAYMOND,
R. A. SCHAEFER.